United States Patent
Kao et al.

(10) Patent No.: US 8,947,378 B2
(45) Date of Patent: Feb. 3, 2015

(54) PORTABLE ELECTRONIC APPARATUS AND TOUCH SENSING METHOD

(75) Inventors: Yih-Feng Kao, Taoyuan (TW); Chih-Feng Hsu, Taoyuan (TW); Li-Hui Chen, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 161 days.

(21) Appl. No.: 13/346,848

(22) Filed: Jan. 10, 2012

(65) Prior Publication Data

US 2013/0176266 A1    Jul. 11, 2013

(51) Int. Cl.
*G09G 5/00*    (2006.01)
(52) U.S. Cl.
USPC ........ 345/173; 345/174; 345/175; 178/18.01; 178/18.04; 178/18.06
(58) Field of Classification Search
USPC ...................... 345/173–179; 178/18.01–19.06
See application file for complete search history.

(56) References Cited

U.S. PATENT DOCUMENTS

| | | | |
|---|---|---|---|
| 5,402,151 A * | 3/1995 | Duwaer | 345/173 |
| 6,504,530 B1 * | 1/2003 | Wilson et al. | 345/173 |
| 8,482,530 B2 | 7/2013 | Bollinger | |
| 2009/0195518 A1 * | 8/2009 | Mattice et al. | 345/177 |
| 2011/0199328 A1 * | 8/2011 | Long | 345/174 |

FOREIGN PATENT DOCUMENTS

| | | |
|---|---|---|
| CN | 102214046 A | 10/2011 |
| TW | 200839590 A1 | 10/2008 |

OTHER PUBLICATIONS

Taiwan Office Action dated Sep. 11, 2014.
English translation of abstract of TW 200839590 A1 (published Oct. 1, 2008).
English translation of abstract of CN 102214046 A (published Oct. 12, 2011).

* cited by examiner

*Primary Examiner* — Jennifer Nguyen
(74) *Attorney, Agent, or Firm* — McClure, Qualey & Rodack, LLP

(57) ABSTRACT

The invention discloses a touch sensing method and a portable electronic apparatus. The portable electronic apparatus includes a capacitive touch sensor unit, an acoustic touch sensor unit and a processing unit. The capacitive touch sensor unit and the acoustic touch sensor unit are used for monitoring a touch input interface. When both of the capacitive touch sensor unit and the acoustic touch sensor unit sense a touch input on the touch input interface at the same time and in response generate a first sensed coordinate and a second sensed coordinate respectively, the processing unit selects or executes an application function on the touch input interface according to the first sensed coordinate.

12 Claims, 3 Drawing Sheets

PORTABLE ELECTRONIC APPARATUS AND TOUCH SENSING METHOD

BACKGROUND

1. Field of Invention

The present invention relates to touch sensing techniques. More particularly, the present invention relates to touch sensing techniques and their application to a portable electronic apparatus.

2. Description of Related Art

A modern touch panel has advantages, such as being user-friendly, fast response times, compact size, etc. The touch panel may provide users a convenient and intuitive way to manipulate an electronic device. Therefore, touch panels are widely used in all kinds of consumer electronics, e.g., e-books, personal digital assistants (PDAs), smart phones, laptop computers, point of sale (POS) systems, etc.

In general, a touch panel is formed by a display panel and a touch sensor module disposed on the display panel. A transparent touch sensor film is adhered on the display panel, so as to realize touch sensing and display functions at the same time. Because of recent improvements made in the sensing precision of the aforesaid touch-sensing equipment, the modern touch panel is now popular among users, and it is gradually replacing traditional input devices, e.g., keyboards and mouse devices, in many systems.

Currently, a Graphical User Interface (GUI) is typically used as the user interface in a touch panel. There are several objects, e.g., functional shortcuts or Widgets, displayed on the desktop of the Graphical User Interface.

The objects displayed on the desktop are distributed on different spots in two dimensions over the screen. When a user touches the touch sensor module, a touch input with a horizontal coordinate and a vertical coordinate is induced. On the basis of the horizontal coordinate and the vertical coordinate of the touch input, a corresponding object on the user interface can be selected or an application function of the object can be executed.

Several kinds of touch sensing technologies have been developed, including those based on resistive, surface acoustic wave, surface capacitive, projected capacitive, infrared, and optical imaging techniques.

Recently, some devices with multi-touch input functions based on capacitive sensing techniques have been well-received. Therefore, both the sensing capability and production technology of capacitive sensors have improved considerably in recent times. In general, the capacitive sensor detects the capacitance variance between arranged transparent electrodes in response to human finger contact, and determines the contact coordinates according to the induced current caused by the finger contact.

However, the capacitive touch panel may only react to an electrostatic object with conductivity, e.g., a finger, and can not detect a non-electrostatic object without conductivity, e.g., a stylus. As a result, the scope of application of capacitive touch panel is limited.

SUMMARY

In order to solve the aforesaid problem, this disclosure provides a portable electronic apparatus and a touch sensing method thereof. An electrostatic touch sensor unit (e.g., a capacitive touch sensor unit) and a non-electrostatic touch sensor unit (e.g., an acoustic touch sensor unit) are both provided in the portable electronic apparatus. Based on the cooperation of these two touch sensor units, the apparatus and method in this disclosure may operate in response to various kinds of touch objects while maintaining the touch precision of the touch sensing function.

Therefore, an aspect of the invention is to provide a portable electronic apparatus, which includes a capacitive touch sensor unit, an acoustic touch sensor unit and a processing unit. The capacitive touch sensor unit is used for monitoring a touch input interface. The capacitive touch sensor unit selectively generates a first sensed coordinate. The acoustic touch sensor unit is used for monitoring the touch input interface. The acoustic touch sensor unit selectively generates a second sensed coordinate. The processing unit is coupled to the capacitive touch sensor unit and the acoustic touch sensor unit. When both of the capacitive touch sensor unit and the acoustic touch sensor unit sense a touch input on the touch input interface at the same time and in response generate the first sensed coordinate and the second sensed coordinate respectively, the processing unit selects or executes an application function on the touch input interface according to the first sensed coordinate.

According to an embodiment of this disclosure, when the capacitive touch sensor unit senses the touch input on the touch input interface, the processing unit determines that the touch input was inputted via an electrostatic object and displays a corresponding determination result of the touch input.

According to another embodiment of this disclosure, when only the acoustic touch sensor unit senses the touch input on the touch input interface, the processing unit selects or executes an application function on the touch input interface according to the second sensed coordinate. In this embodiment, when only the acoustic touch sensor unit senses the touch input on the touch input interface, the processing unit determines that the touch input was inputted via a non-electrostatic object and displays a corresponding determination result of the touch input.

According to another embodiment of this disclosure, when only the capacitive touch sensor unit senses the touch input on the touch input interface, the processing unit selects or executes an application function on the touch input interface according to the first sensed coordinate.

Another aspect of the invention is to provide a portable electronic apparatus, which includes an electrostatic touch sensor unit, a non-electrostatic touch sensor unit and a processing unit. The electrostatic touch sensor unit is used for monitoring a touch input interface. The electrostatic touch sensor unit selectively generates a first sensed coordinate. The electrostatic touch sensor unit is used for monitoring a touch input interface. The electrostatic touch sensor unit selectively generates a first sensed coordinate. The non-electrostatic touch sensor unit is used for sensing the touch input interface. The non-electrostatic touch sensor unit selectively generates a second sensed coordinate. The processing unit is coupled to the electrostatic touch sensor unit and the non-electrostatic touch sensor unit. When both of the electrostatic sensor unit and the non-electrostatic wave sensor unit sense a touch input on the touch input interface at the same time and in response generate the first sensed coordinate and the second sensed coordinate respectively, the processing unit selects or executes an application function on the touch input interface according to the first sensed coordinate.

According to an embodiment of this disclosure, when only the non-electrostatic touch sensor unit senses the touch input on the touch input interface, the processing unit selects or executes an application function on the touch input interface according to the second sensed coordinate.

According to another embodiment of this disclosure, when only the electrostatic touch sensor unit senses the touch input on the touch input interface, the processing unit selects or executes an application function on the touch input interface according to the first sensed coordinate.

Another aspect of the invention is to provide a touch sensing method for a portable electronic apparatus. The electronic apparatus includes a capacitive touch sensor unit and an acoustic touch sensor unit. The capacitive touch sensor unit and the acoustic touch sensor unit are used for sensing a touch input on a touch input interface. The touch sensing method includes steps of: determining whether the capacitive touch sensor unit has generated a first sensed coordinate; selecting or executing an application function on the touch input interface according to the first sensed coordinate if the capacitive touch sensor unit has generated the first sensed coordinate; if the capacitive touch sensor unit has not generated the first sensed coordinate, further determining whether the acoustic touch sensor unit has generated a second sensed coordinate; and selecting or executing an application function on the touch input interface according to the second sensed coordinate if the acoustic touch sensor unit has generated the second sensed coordinate.

According to an embodiment of this disclosure, the touch sensing method further includes steps of: determining whether the touch input was inputted via an electrostatic object or a non-electrostatic object; and displaying a determination result of the touch input. In this embodiment, when the capacitive touch sensor unit senses the touch input on the touch input interface, the touch input is determined to have been inputted via an electrostatic object. On the other hand, when only the acoustic touch sensor unit senses the touch input on the touch input interface, the touch input is determined to have been inputted via a non-electrostatic object.

BRIEF DESCRIPTION OF THE DRAWINGS

The invention can be more fully understood by reading the following detailed description of the embodiment, with reference made to the accompanying drawings as follows.

DETAILED DESCRIPTION

Figure 2:
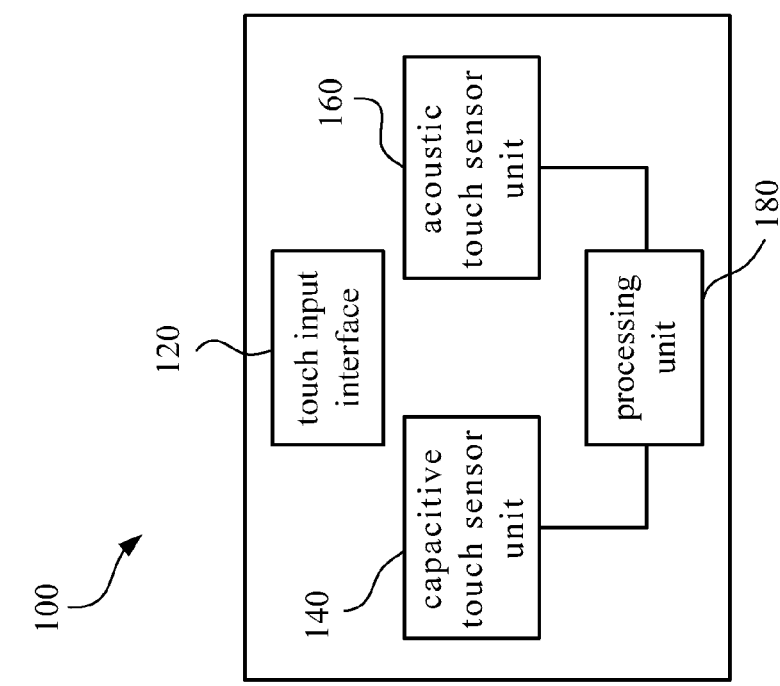
FIG. 2 is a functional block diagram illustrating the portable electronic apparatus shown in FIG. 1.
Figure 1:
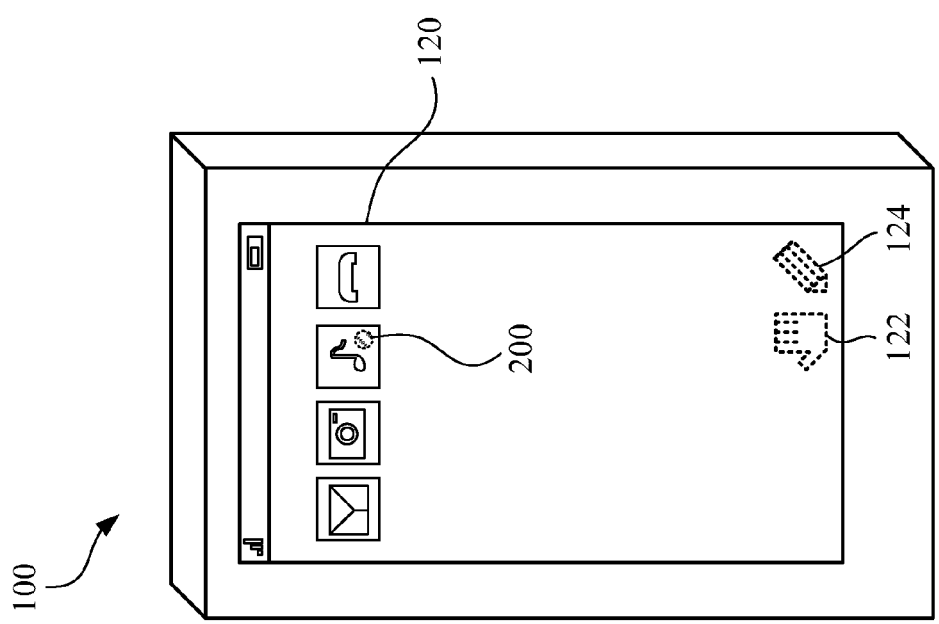
FIG. 1 is a perspective view illustrating a portable electronic apparatus according to an embodiment of the invention.

FIG. 1 is a perspective view illustrating a portable electronic apparatus 100 according to an embodiment of the invention. FIG. 2 is a functional block diagram illustrating the portable electronic apparatus 100 shown in FIG. 1.

As shown in FIG. 1, a touch input interface 120 is disposed on the portable electronic apparatus 100. For example, the touch input interface 120 can be a touch panel integrated with a display module. The display module and the touch panel can be integrated as a touch screen. The touch screen may show a plurality of displayed objects, such as battery durability information, program icons, etc.

As shown in FIG. 2, the portable electronic apparatus 100 in the embodiment may include a capacitive touch sensor unit 140, an acoustic touch sensor unit 160 and a processing unit 180. Each of the capacitive touch sensor unit 140 and the acoustic touch sensor unit 160 can be used for sensing touch input on the touch input interface 120. As a result, any touch input (such as the touch input 200 shown in FIG. 1) corresponding to user manipulation on the touch input interface 120 can be detected.

The capacitive touch sensor unit 140 may selectively generate a first sensed coordinate according the sensed touch input 200. Due to significant developments in technology related to capacitive sensors in recent times, the capacitive touch sensor unit 140 has a high degree of sensing precision and high response speed. In general, the capacitive touch sensor unit 140 detects the capacitance variance between arranged transparent electrodes in response to electrostatic charges on a human finger contact, so as to determine the contact coordinates according to the induced current caused by the finger contact. Therefore, the capacitive touch sensor unit 140 is mainly used for sensing an electrostatic object with conductivity, e.g., a finger.

On the other hand, the acoustic touch sensor unit 160 may selectively generate a second sensed coordinate according the sensed touch input 200. The acoustic touch sensor unit 160 can be utilized to emit ultrasonic waves and calculate the magnitude of the reflected ultrasonic waves, such that the acoustic touch sensor unit 160 may determine the location of a touch contact. Because the touch contact may partially absorb the ultrasonic waves and reduce their intensity, the intensity of the ultrasonic waves encountering the touch contact will be reduced. The acoustic touch sensor unit 160 may perform calculations based on the reduction of intensity between the situations with and without the user contact, so as to map the located coordinate of the touch input 200. Because the acoustic touch sensor unit 160 performs detection using acoustic waves, the sensing result is not related to the conductive properties of the object used to perform the touch contact. That is, the sensing result is unrelated to whether the object is an electrostatic object or a non-electrostatic object. Therefore, the acoustic touch sensor unit 160 may be used for objects having different conductive properties.

The processing unit 180 is coupled to each of the capacitive touch sensor unit 140 and the acoustic touch sensor unit 160. The processing unit 180 is used for processing the sensing results of these sensor units 140, 160.

In the embodiment, when both of the capacitive touch sensor unit 140 and the acoustic touch sensor unit 160 sense a touch input 200 on the touch input interface 120 at the same time and as a result generate the first sensed coordinate and the second sensed coordinate respectively, the processing unit 180 selects or executes an application function on the touch input interface 120 according to the first sensed coordinate generated by the capacitive touch sensor unit 140. For example, the processing unit 180 may execute the function of playing music according to the location of the touch input 200 in this embodiment. In this case, when both of the capacitive touch sensor unit 140 and the acoustic touch sensor unit 160 sense a touch input 200 on the touch input interface 120 at the same time, the processing unit 180 may determine that the touch input 200 has been inputted via an electrostatic object. Furthermore, the processing unit 180 may display a corresponding determination result of the touch input 200 on the touch screen. For example, a hand-shaped display icon 122 in FIG. 1 can be shown on the touch screen for indicating the determination result.

The capacitive touch sensor unit 140 is mainly used for sensing electrostatic objects, while the acoustic touch sensor unit 160 may sense both electrostatic objects and the non-electrostatic objects. In this case, when the capacitive touch sensor unit 140 senses the touch input 200, the processing unit 180 may determine that the touch input 200 has been inputted via an electrostatic object.

On the other hand, when only the acoustic touch sensor unit 160 senses the touch input 200 on the touch input interface, the processing unit 180 selects or executes an application function on the touch input interface 120 according to the second sensed coordinate generated by the acoustic touch sensor unit 160. In this embodiment, when only the acoustic touch sensor unit 160 senses the touch input 200, the processing unit 180 determines that the touch input 200 has been inputted via a non-electrostatic object and displays a corresponding determination result of the touch input. For example, a pen-shaped display icon 124 in FIG. 1 can be shown on the touch screen for indicating the determination result.

In some situations (for example, the acoustic touch sensor unit 160 is malfunctioning or the touch contact is below a sensible threshold of the acoustic touch sensor unit 160), only the capacitive touch sensor unit 140 may sense the touch input. In this case, the processing unit 180 selects or executes an application function according to the first sensed coordinate.

In aforesaid embodiment, the portable electronic apparatus 100 includes a capacitive touch sensor unit 140 and an acoustic touch sensor unit 160 by way of example, but the disclosure is not limited in this regard. In another embodiment, the capacitive touch sensor unit 140 may comprise a different type of electrostatic touch sensor unit. Furthermore, in another embodiment, the acoustic touch sensor unit 160 may comprise a different type of non-electrostatic touch sensor unit, such as a resistive touch sensor unit, an infrared touch sensor unit or an optical imaging touch sensor unit.

Figure 3:
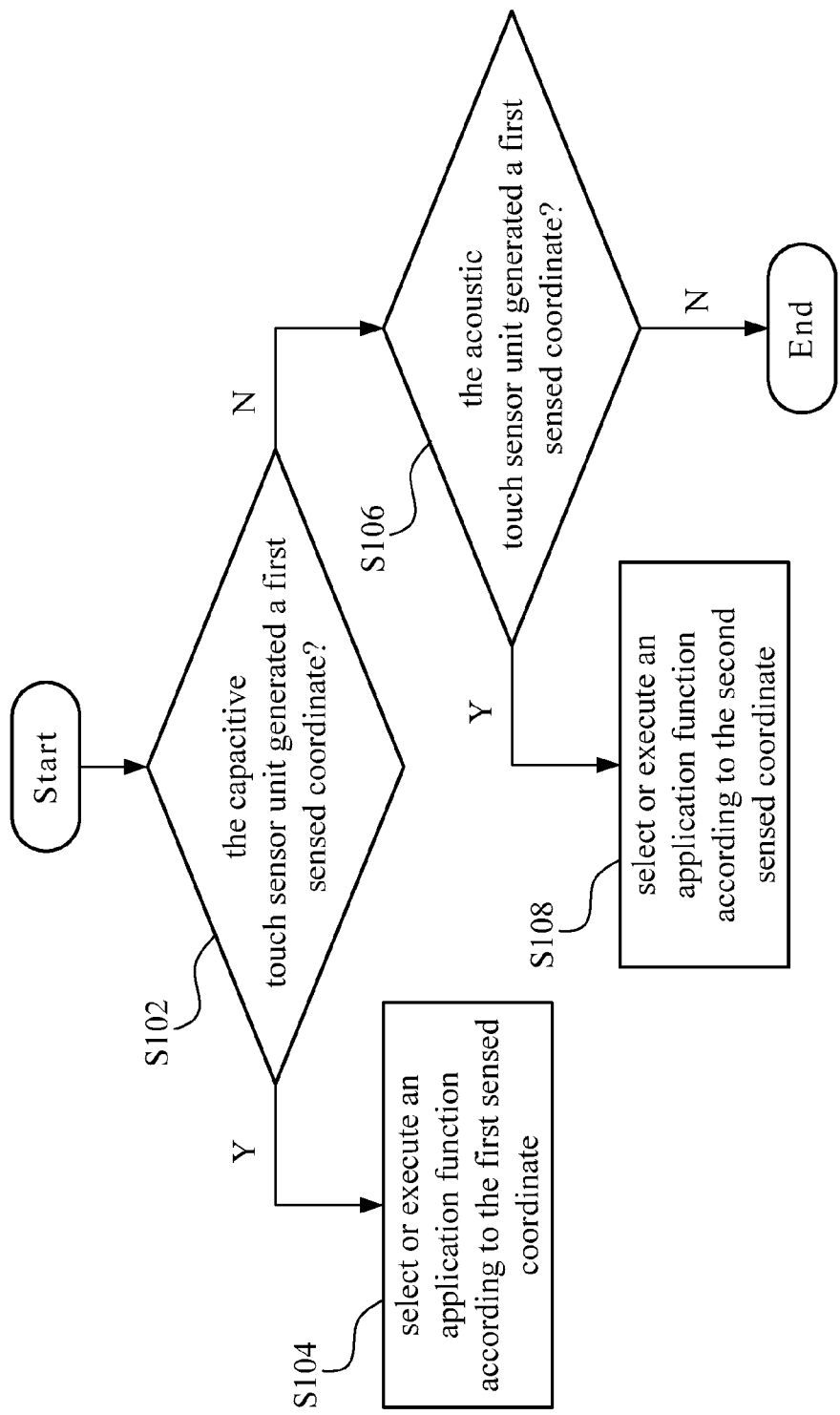
FIG. 3 is a flow chart illustrating a touch sensing method according to an embodiment of the invention.

FIG. 3 is a flow chart illustrating a touch sensing method according to an embodiment of the invention. In the embodiment, the touch sensing method is implemented by a portable electronic apparatus. The electronic apparatus includes a capacitive touch sensor unit and an acoustic touch sensor unit. The capacitive touch sensor unit and the acoustic touch sensor unit are used for sensing a touch input on a touch input interface. The structure of the portable electronic apparatus may be identical to that of the portable electronic apparatus 100 shown in FIG. 1 and FIG. 2, and so an explanation thereof will not be repeated.

As shown in FIG. 3, in step S102, a determination is made as to whether the capacitive touch sensor unit has generated a first sensed coordinate corresponding to a touch input.

If the capacitive touch sensor unit has generated the first sensed coordinate, step S104 is performed, in which an application function (e.g., playing music, dialing, taking a picture, sending email, etc.) corresponding to the location of the touch input on the touch input interface is selected or executed according to the first sensed coordinate generated by the capacitive touch sensor unit.

On the other hand, if the capacitive touch sensor unit has not generated the first sensed coordinate, the touch sensing method branches to step S106, in which a determination is made as to whether the acoustic touch sensor unit has generated a second sensed coordinate. If the acoustic touch sensor unit has generated the second sensed coordinate, step S108 is performed, in which an application function on the touch input interface is selected or executed according to the second sensed coordinate.

In other words, when both of the capacitive touch sensor unit and the acoustic touch sensor unit sense a touch input on the touch input interface at the same time, the first sensed coordinate generated by the capacitive touch sensor unit is given higher priority.

On the other hand, when the user utilizes a non-electrostatic object without conductivity to contact the touch input interface, the acoustic touch sensor unit generates the second sensed coordinate corresponding to the touch input. In this case, the acoustic touch sensor unit is able to perform such detection even though the capacitive touch sensor unit is unable to sense the non-electrostatic contact.

Figure 4:
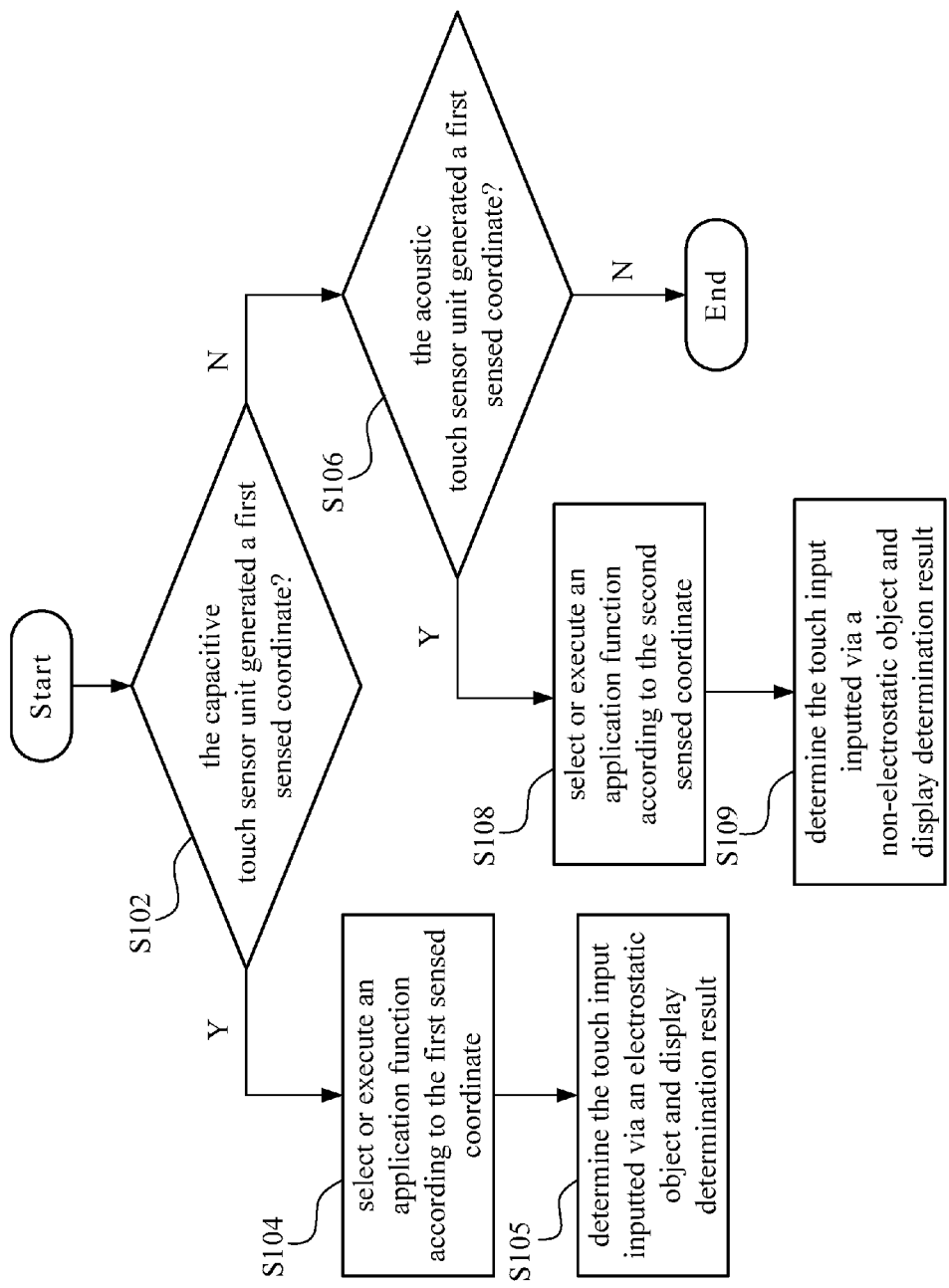
FIG. 4 is a flow chart illustrating a touch sensing method according to another embodiment of the invention.

In some embodiments, a determination may be made as to which kind of contact object has performed a touch input following detection by the capacitive touch sensor unit and the acoustic touch sensor unit. FIG. 4 is a flow chart illustrating a touch sensing method according to another embodiment of the invention.

As shown in FIG. 4, in the touch sensing method of this embodiment, after the first sensed coordinate is generated by the capacitive touch sensor unit and step S104 is performed, step S105 is further performed, in which a determination is made that the touch input was inputted via an electrostatic object, and the determination result (for example, the hand-shaped display icon 122 shown in FIG. 1) is displayed.

On the other hand, if the capacitive touch sensor unit has not generated the first sensed coordinate, after the second sensed coordinate is generated by the acoustic touch sensor unit and step S108 is performed, step S109 is further performed, in which a determination is made that the touch input was inputted via a non-electrostatic object, and the determination result (for example, the hand-shaped display icon 122 shown in FIG. 1) is displayed.

Therefore, based on the cooperation of these two touch sensor units, the portable electronic apparatus and the touch sensing method in this disclosure may operate in response to various kinds of touch objects while maintaining the touch precision of the touch sensing function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable electronic apparatus, comprising:
a capacitive touch sensor unit for monitoring a touch input interface, the capacitive touch sensor unit selectively generating a first sensed coordinate;
an acoustic touch sensor unit for monitoring the touch input interface, the acoustic touch sensor unit selectively generating a second sensed coordinate; and
a processing unit coupled to the capacitive touch sensor unit and the acoustic touch sensor unit;
wherein the processing unit selects an application function on the touch input interface according to the first sensed coordinate when both of the capacitive touch sensor unit and the acoustic touch sensor unit sense a touch input on the touch input interface and in response generate the first sensed coordinate and the second sensed coordinate respectively.

2. The portable electronic apparatus of claim 1, wherein, when the capacitive touch sensor unit senses the touch input on the touch input interface, the processing unit determines that the touch input was inputted via an electrostatic object and displays a corresponding determination result of the touch input.

3. The portable electronic apparatus of claim 1, wherein, when only the acoustic touch sensor unit senses the touch input on the touch input interface, the processing unit selects or executes an application function on the touch input interface according to the second sensed coordinate.

4. The portable electronic apparatus of claim 3, wherein, when only the acoustic touch sensor unit senses the touch input on the touch input interface, the processing unit determines that the touch input was inputted via a non-electrostatic object and displays a corresponding determination result of the touch input.

5. The portable electronic apparatus of claim 1, wherein, when only the capacitive touch sensor unit senses the touch input on the touch input interface, the processing unit selects or executes an application function on the touch input interface according to the first sensed coordinate.

6. A portable electronic apparatus, comprising:
   an electrostatic touch sensor unit for monitoring a touch input interface, the electrostatic touch sensor unit selectively generating a first sensed coordinate;
   a non-electrostatic touch sensor unit for monitoring the touch input interface, the non-electrostatic touch sensor unit selectively generating a second sensed coordinate; and
   a processing unit coupled to the electrostatic touch sensor unit and the non-electrostatic touch sensor unit;
   wherein the processing unit selects an application function on the touch input interface according to the first sensed coordinate when both of the electrostatic sensor unit and the non-electrostatic wave sensor unit sense a touch input on the touch input interface and in response generate the first sensed coordinate and the second sensed coordinate respectively.

7. The portable electronic apparatus of claim 6, wherein, when only the non-electrostatic touch sensor unit senses the touch input on the touch input interface, the processing unit selects or executes an application function on the touch input interface according to the second sensed coordinate.

8. The portable electronic apparatus of claim 6, wherein, when only the electrostatic touch sensor unit senses the touch input on the touch input interface, the processing unit selects or executes an application function on the touch input interface according to the first sensed coordinate.

9. A touch sensing method for a portable electronic apparatus, the portable electronic apparatus comprising a capacitive touch sensor unit and an acoustic touch sensor unit, the capacitive touch sensor unit and the acoustic touch sensor unit being used for sensing a touch input on a touch input interface, the touch sensing method comprising:
   determining whether the capacitive touch sensor unit has generated a first sensed coordinate;
   determining whether the acoustic touch sensor unit has generated a second sensed coordinate; and
   selecting an application function on the touch input interface according to the first sensed coordinate when both of the electrostatic sensor unit and the non-electrostatic wave sensor unit sense a touch input on the touch input interface and in response generate the first sensed coordinate and the second sensed coordinate respectively.

10. The touch sensing method of claim 9, further comprising:
    determining whether the touch input was inputted via an electrostatic object or a non-electrostatic object; and
    displaying a determination result of the touch input.

11. The touch sensing method of claim 10, wherein, when the capacitive touch sensor unit senses the touch input on the touch input interface, the touch input is determined to have been inputted via an electrostatic object.

12. The touch sensing method of claim 10, wherein, when only the acoustic touch sensor unit senses the touch input on the touch input interface, the touch input is determined to have been inputted via a non-electrostatic object.

* * * * *